Figure 1:
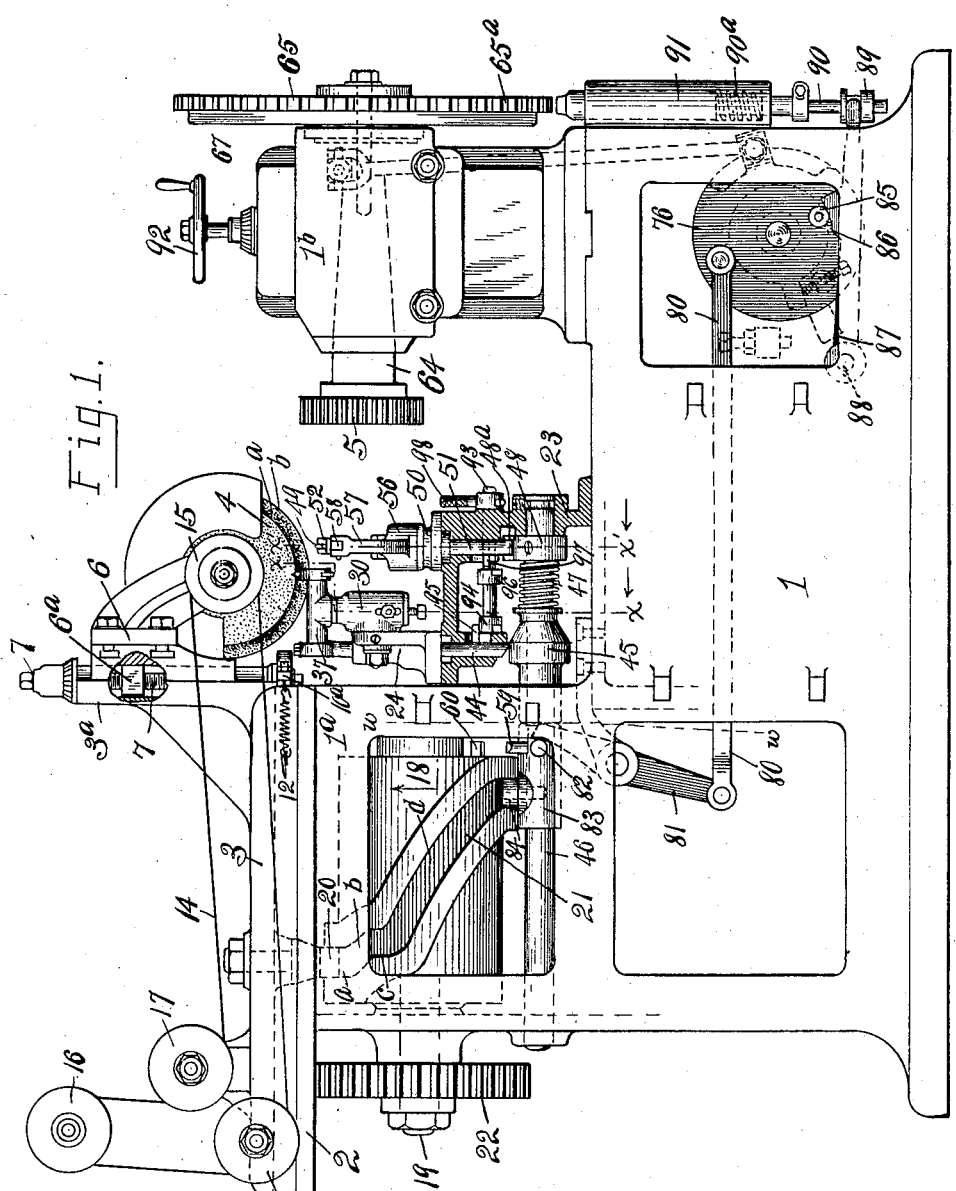

No. 888,675. PATENTED MAY 26, 1908.
F. A. WARD & W. N. TAYLOR.
GRINDING WHEEL TRIMMING MECHANISM FOR GEAR TRUING MACHINES.
APPLICATION FILED MAR. 27, 1907.

4 SHEETS—SHEET 1.

WITNESSES:
D. C. Walter
Hazel B. Hiett

INVENTORS.
William N. Taylor,
Frederick A. Ward,
By Owen & Owen
Their attys.

No. 888,675. PATENTED MAY 26, 1908.
F. A. WARD & W. N. TAYLOR.
GRINDING WHEEL TRIMMING MECHANISM FOR GEAR TRUING MACHINES.
APPLICATION FILED MAR. 27, 1907.
4 SHEETS—SHEET 2.
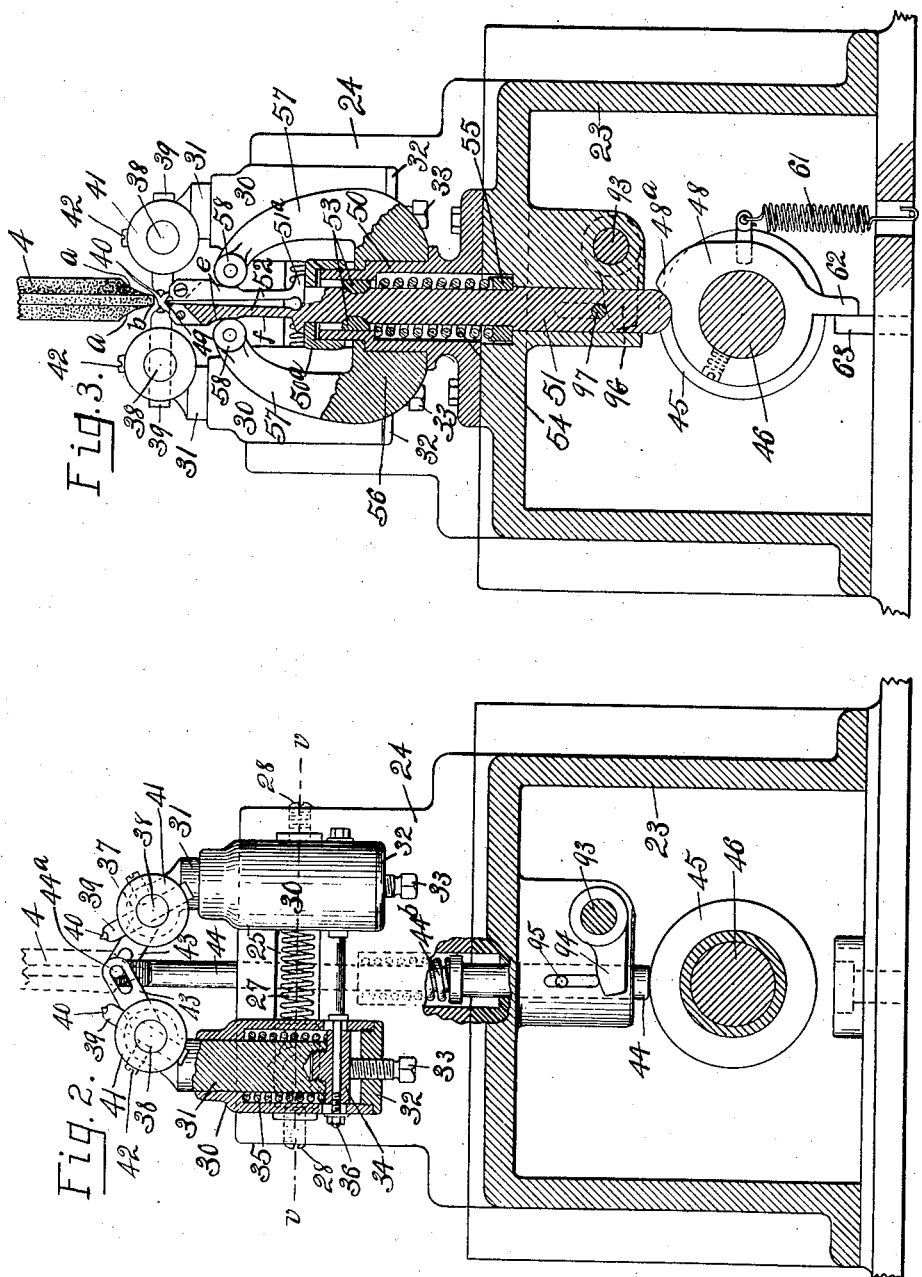
WITNESSES:
D. C. Walter
Hazel B. Hiett
INVENTOR.
William N. Taylor
Frederick A. Ward
By Owen & Owen
Their attys No. 888,675. PATENTED MAY 26, 1908.
F. A. WARD & W. N. TAYLOR.
GRINDING WHEEL TRIMMING MECHANISM FOR GEAR TRUING MACHINES.
APPLICATION FILED MAR. 27, 1907.
4 SHEETS—SHEET 3.
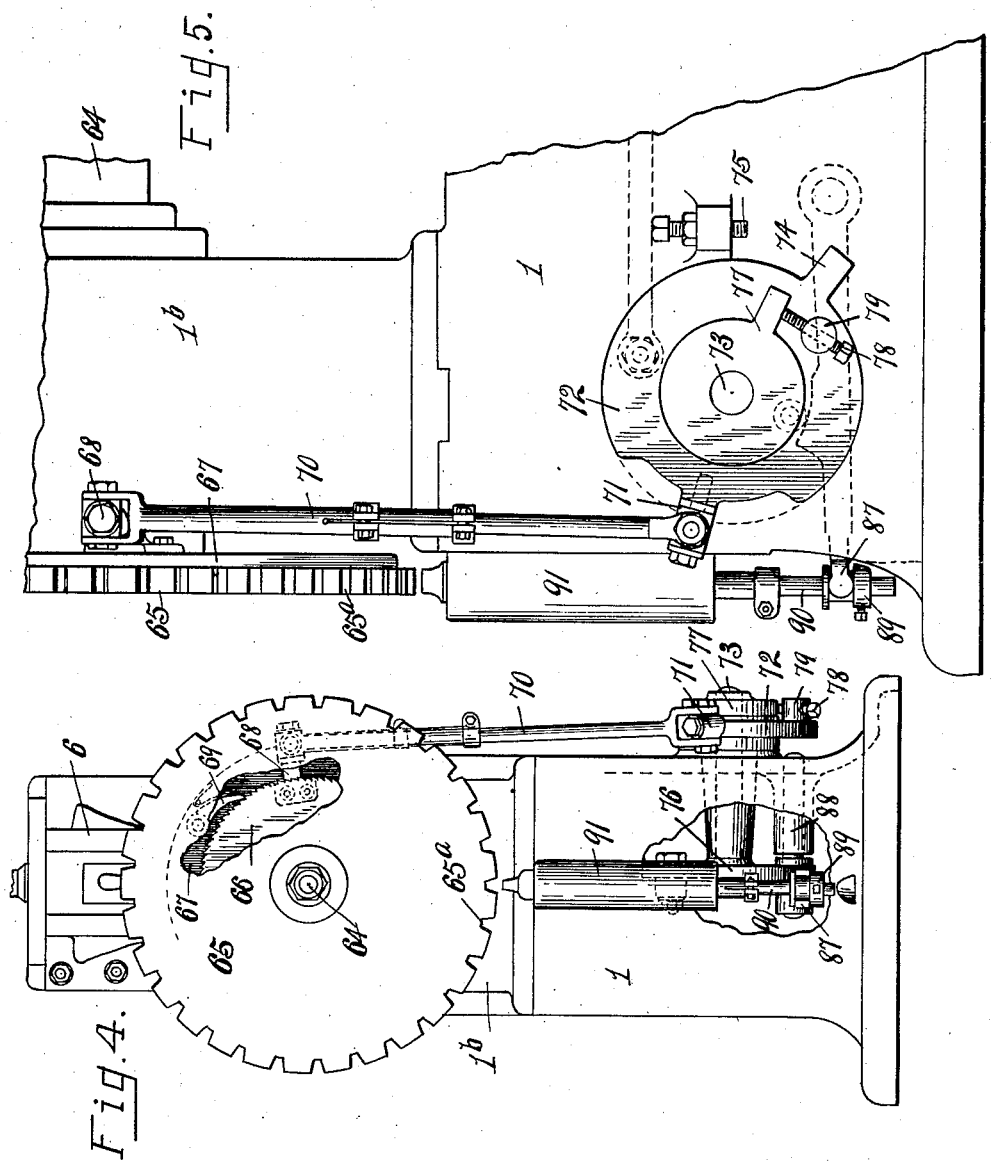
WITNESSES:
D. C. Walter
Hazel B. Hiett
INVENTOR.
William N. Taylor,
Frederick A. Ward,
By Owen & Owen,
Their attys.

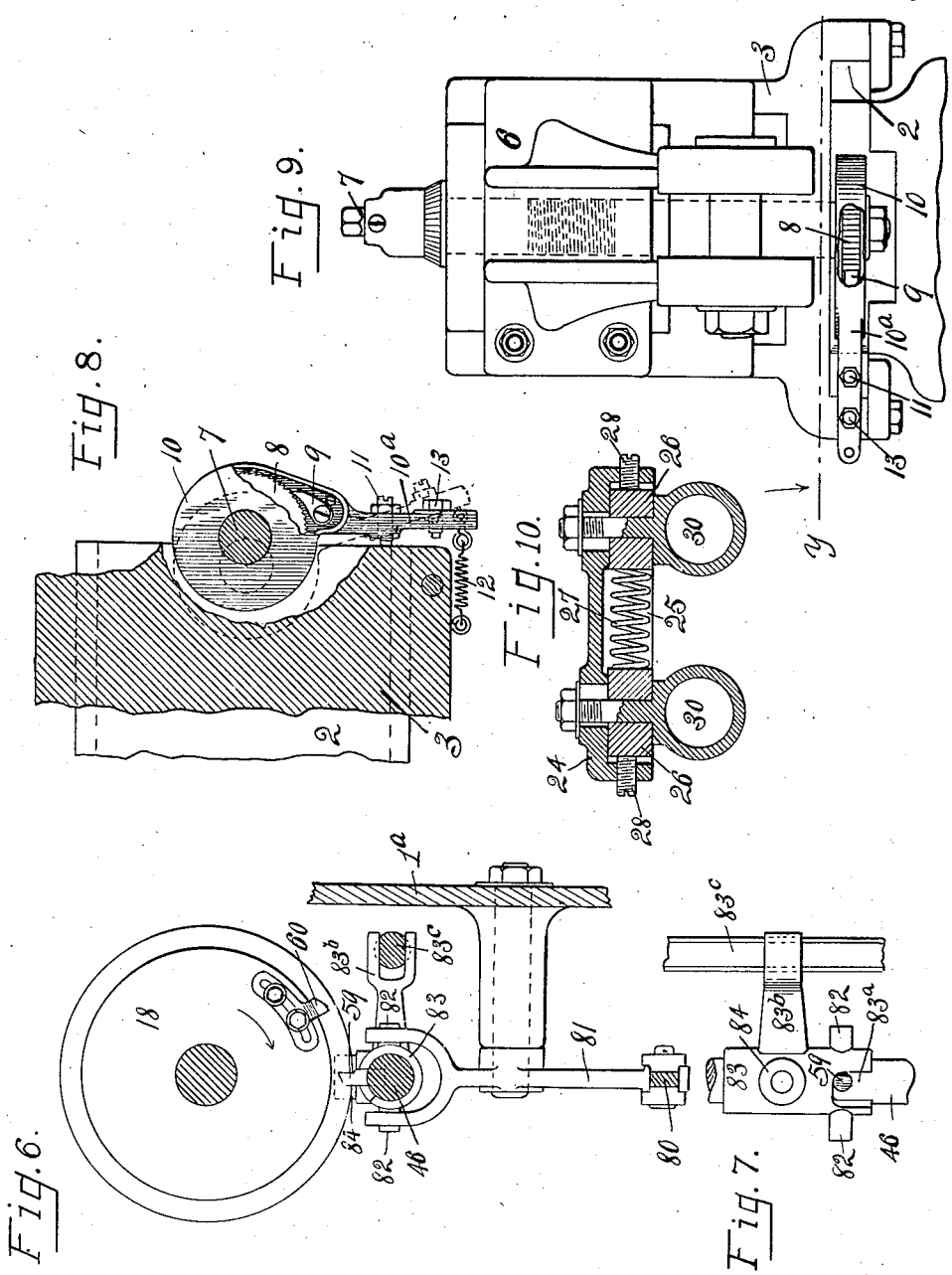

UNITED STATES PATENT OFFICE.

FREDERICK A. WARD AND WILLIAM N. TAYLOR, OF TOLEDO, OHIO, ASSIGNORS TO THE GEAR GRINDING MACHINE COMPANY, OF DETROIT, MICHIGAN, A CORPORATION OF MICHIGAN.

GRINDING-WHEEL-TRIMMING MECHANISM FOR GEAR-TRUING MACHINES.

No. 888,675.  Specification of Letters Patent.  Patented May 26, 1908.

Application filed March 27, 1907. Serial No. 364,855.

*To all whom it may concern:*

Be it known that we, FREDERICK A. WARD and WILLIAM N. TAYLOR, citizens of the United States, and residents of Toledo, in the county of Lucas and State of Ohio, have invented a certain new and useful Grinding-Wheel-Trimming Mechanism for Gear-Truing Machines; and we do hereby declare the following to be a full, clear, and exact description of the invention, such as will enable others skilled in the art to which it appertains to make and use the same, reference being had to the accompanying drawings, and to the figures and letters of reference marked thereon, which form a part of this specification.

Our invention relates to grinding machines, and has reference more particularly to means for use in gear trimming or grinding machines for trimming or truing the grinding-medium thereof after operating on the teeth of a gear.

Considerable difficulty has been experienced in the manufacture of gears due to the warping thereof, which invariably occurs during the hardening or tempering process. This warping, while it may be very slight, is very perceptible in a running thereof, causing what may be termed, a noisy or rattling gear, which is most objectionable when present in the gearing of automobiles or other machines in which quietness and smoothness of running is desired. Attempts have been made to true the gear teeth after the tempering thereof by passing a grinding-medium across the same, but these so far as we are aware have all been impractical and unsuccessful due to the absence of means for trimming the grinding-medium to compensate for the wear occasioned by each grinding operation.

The object of our invention is to obviate the above difficulties and to make the mechanical truing of gears possible by the provision, in combination with a revolving grinding-medium movable across the teeth of a gear which is mounted for a properly timed intermittent rotation, of highly efficient mechanism for automatically trimming the gear-coacting surface of the grinding-medium after each operation to cause it to conform to the shape and size of the teeth acted on, so that when the trimming or truing of the gear is completed the contour of each tooth conforms exactly to that of all the others.

A further object of our invention is the provision of simple and efficient means for imparting a predetermined movement to the grinding - medium relative to its plane of reciprocatory movement whereby to compensate for the wear or gradually diminishing size of the grinding-medium after each operation on the gear.

The operation, construction, and arrangement of the parts of the invention are fully described in the following specification, and illustrated in the accompanying drawings, in which,—

Figure 1 is a side elevation of a machine embodying the features of our invention. Figs. 2 and 3 are partial transverse sections of the same taken, respectively, on the dotted lines $x\ x$ and $x'\ x'$ in Fig. 1, the former showing the rear trimmers elevated as they appear immediately after making a cut, and the latter showing both sets of trimmers in lowered or normal position. Fig. 4 is an elevation of the end of the machine carrying the work, with portions broken away. Fig. 5 is an enlarged partial elevation of the opposite side of said end portion to that shown in Fig. 1. Fig. 6 is a vertical section on the dotted line $w\ w$ in Fig. 1. Fig. 7 is a top detail of a portion of the parts shown in Fig. 6. Fig. 8 is a sectional detail of a portion of the means employed to impart a vertical movement to the grinding-medium taken on the dotted line $y\ y$ in Fig. 9. Fig. 9 is an end elevation of the same with the grinding-medium removed; and Fig. 10 is a transverse section taken on the dotted line $v\ v$ in Fig. 2.

Referring to the drawings, 1 designates the frame, which is provided at one end with the elevated portion $1^a$ carrying the grinding parts and at the other end with the elevated portion $1^b$, carrying the work mandrel and a portion of its controlling parts.

The frame portion $1^a$ is formed on its top with a longitudinally extending slide-way 2 on which a carriage 3 is mounted for longitudinal movement relative to the frame to permit the grinding-wheel 4, which is revolubly carried at its inner end, to be moved forward and backward across the face of the gear-wheel 5, which latter is carried as hereinafter described. The grinding-wheel 4 is journaled in a bracket 6, which is slidingly carried by a head $3^a$, formed at the inner end of the carriage 3, for vertical adjustment relative to the plane of movement of the carriage. This adjustment is effected at each return movement of the carriage by the fractional revolution of a screw 7, which is vertically mounted in the head 3ª and passes through a threaded aperture in a boss 6ª formed on the inner side of the bracket 6, as shown in Fig. 1. A ratchet-wheel 8 is carried at the lower end of the screw-shaft 7 and is engaged by a pawl 9, which is pivoted to a ratchet-wheel incasing member 10, as shown in Figs. 8 and 9. This incasing member is loosely mounted on the screw-shaft and has an arm 10ª projecting therefrom in position for a screw 11 thereon to have contact with an alining portion of the slide-way 2 just prior to the limit of return or rearward movement of the carriage, whereby to impart a predetermined degree of revolution to the screw-shaft 7, the dotted lines in Fig. 8 illustrating the action of said parts. The arm 10ª is normally retained at its limit of inward movement relative to the carriage 3 by a coiled contraction spring 12, secured as shown in Fig. 8, and this inward movement is regulated by a contact screw 13 carried by the arm. It is apparent that each lowering movement of the grinding-wheel is very slight, being only sufficient for the trimming made necessary by the wear after a grinding operation, and that such movement is regulated by the number of threads per inch on the screw 7, the number of teeth on the ratchet-wheel 8, and the throw given the pawl 9.

The grinding-wheel 4 is driven by a belt 14, which connects the sheave 15 on the wheel shaft and the drive-sheave 16 carried by a line or other suitably driven shaft. The course of the belt is guided intermediate the sheaves 15 and 16 by the two sheaves 17, 17, which are carried at the rear or outer end of the carriage 3, as shown in Fig. 1. The requisite longitudinal movement is imparted to the carriage 3 from the rotary movement of a drum 18, which is mounted on the shaft 19 beneath the carriage, due to an idler-roll 20, carried at the under side of the carriage, traveling in a cam groove 21 formed in the circumference of the drum, said groove being shaped as hereinafter more particularly described. A gear-wheel 22 is carried at the outer end of the shaft 19, and has connection through suitable intermediate gearing with a source of power.

Supported by the frame 1 intermediate the elevated portions 1ª and 1ᵇ thereof is the frame part 23, which in turn supports the standard or bracket 24. This standard or bracket has its forward faces formed with a horizontal groove 25 in each end of which is slidingly mounted a block 26, which blocks are yieldingly spaced apart by a coiled compression spring 27 and are relatively adjusted by adjusting-screws 28, as best shown in Fig. 10. Secured to the forward or outer face of each block 26 by a bolt or stem passing through it and a horizontal slot in the standard and receiving a nut at the rear end, is a vertical socket 30, which carries a vertically adjustable post 31. The lower end of each socket is closed by a plug 32 through which an adjusting-screw 33 is threaded, said screw coacting with a spring-retainer 34, which is threaded to the lower end of the post 31 and receives the thrust of the lower end of a coiled compression-spring 35. This spring encircles the post and has its upper end thrust against a shoulder in the socket, as shown in Fig. 2. The post is locked in adjusted position by a bolt 36, which passes through the retainer 34 and alining vertical slots in the socket wall, as shown.

The upper end of the posts 31 terminate in horizontally-disposed bearing-heads 37, which are disposed in contiguous position to the lower arc of the grinding-wheel 4 on opposite sides thereof and in each of which is mounted a rock-shaft 38. Radially projecting from the forward ends of the shafts 38 are the two opposing rear diamond-holders 39, each of which carries at one end a diamond 40 for coacting with and trimming the contiguous arc $a$ of the grinding wheel 4. Each diamond-holder 39 passes through a collar 41 carried by the shaft and is secured in adjusted position by a set-screw 42. These holders are intended to be so adjusted relative to the grinding-wheel, when at its limit of rearward movement, that the axis of each coincides with the axis of the contiguous arc $a$ of the wheel, thus causing them, when operated, to effect a superficial trimming of the surfaces $a$, $a$ immediately after each lowering movement of the wheel.

Projecting inwardly from the rear end of each shaft 38 is an arm 43, which arms have their inner ends lapping each other and slotted, as shown, to receive a common pin 44ª carried at the upper end of the vertical push-rod 44, so that a vertical reciprocatory movement of the rod will impart a simultaneous rocking motion to the two shafts 38 and their diamond-holders 39. This rod passes down through a hole in the standard 24 and frame part 23 and has its lower end terminating in position to coact with the conical face of a collar 45, which is slidingly carried by a shaft 46, whereby as said collar is moved from its normal position, by means hereinafter described, the rod is raised against the tension of the coiled compression-spring 44ᵇ to effect an upward movement of the rear trimmer-diamonds 40 to trim the arcs $a$, $a$ of the grinding-wheel. The conical collar 45 is returned to its normal position by the action of the coiled compression-spring 47, which is mounted on the shaft 46 intermediate said collar and the cam-faced collar 48, which is fixed to said shaft and has an additional function hereinafter described.

During the operation of the rear trimmer-diamonds 40 on the wheel 4 the idler-roll 20 of the carriage 3 is traveling in the neutral zone *a* of the cam groove 21 in the drum 18, and at the end of such zone enters the inclined or diagonally-disposed portion *b* of the groove, which causes the carriage to move forward until the axis of the grinding-wheel stands in vertical alinement with the two front trimmer-diamonds 49. At this point the idler-roll 20 enters a second neutral zone *c* of the guiding-groove and effects a momentary pause of the carriage and grinding-wheel to permit said front trimmer-diamonds to act on the wheel before the idler-roll enters the inclined or diagonally-disposed portions *d* of the guiding-groove, which moves the carriage 3 forward sufficiently for the wheel 4 to traverse across the face of the gear 5 for the purpose of truing the contiguous faces of two of its teeth. The guiding-grooves 21 at the end of the diagonal portion *d* thereof is formed with a return bend and continues around the drum forming a reverse diagonal course which meets the neutral zone *a* thereof, thus returning the grinding-wheel to again be trimmed.

Mounted for reciprocal vertical movement in the socket-member 50, secured to the top of the frame part 23 in advance of the standard 24, is a plunger or push-rod 51, the lower end of which is projected through the top of said frame part 23 in position to coact with the cam surface of the collar 48 on the shaft 46, whereby a raising thereof is effected when the collar is turned. The upper end of said plunger or rod is projected to adjacent the lower edge of the grinding-wheel 4 when standing thereover and is bifurcated to form the two arms 52, 52, each of which carries one of the front trimmer-diamonds 49 at its free end in position for their points to abut each other when the free ends of the arms are forced together and to have contact with the periphery or head of the grinding-wheel when the plunger is elevated. The plunger is prevented from turning in its socket by keys 53 which operate in registering grooves in the socket walls. A coiled compression spring 54 encircles the plunger within an enlarged part of the socket, and has its upper end abutting against a shoulder in the socket and its lower end coacting with a collar 55 on the plunger, thus tending to normally maintain the plunger in lowered position, as shown in Fig. 2. The lowering movement of the plunger is shown as being limited by a shoulder 51ª thereon coacting with a cap 50ª, which is secured to the upper end of the socket 50 and through which the plunger operates.

Mounted on the socket-member 50 is a collar or head 56 from the opposite sides of which project the two upwardly extending arms 57, 57, the terminals of which converge and each carries an idler-roll 58 in position to engage the outer face of the contiguous arm 52 of the plunger. As the tendency of the arms 52 is to diverge or remain in open position so that the diamonds 49 would normally be separated, the coaction of the rolls 58 therewith is intended to produce a converging of the diamonds at a predetermined point in the movement of the plunger. For this purpose the arms are provided with the raised surfaces *e* with which the rolls 58 coact when the plunger is down and continues to coact until the plunger is raised sufficiently for the diamonds 49 to have contact with the periphery or bead *b* of the grinding-wheel, at which point the arms begin to spread, due to the rolls passing to the abruptly reduced surfaces *f* of the arms, thus permitting the diamonds 49 to have a diverging movement transversely of the narrow face or bead *b* of the rapidly revolving grinding-wheel whereby to trim the same.

The cam-collar 48, with which the lower end of the plunger or push-rod 51 coacts, is provided with an abrupt projection 48ª by means of which the plunger is suddenly elevated when the shaft 46 is given a partial revolution. The means employed for rocking the shaft 46, as shown in Figs. 1, 6 and 7, consists of a pin 59, which projects from said shaft in position to be struck by a finger 60 at each revolution of the drum 18, said finger being adjustably secured to the inner end of the drum. The shaft 46 and collar 48 are automatically returned to their normal position after the finger 60 has released the pin 59, due to the action of the coiled contraction-spring 61, which has one end fixed to a pin projecting from said collar and its other end fixed to a convenient portion of the frame, as shown in Fig. 3. The return or backward movement of the shaft is limited by a lug 62 on the collar 48 engaging a stop 63 secured to a contiguous frame portion.

The gear-wheel 5 to be trued is carried at the inner end of the horizontal arbor-shaft or mandrel 64, which is journaled in the elevated portion 1ᵇ of the frame and carries the index-wheel or disk 65 at its outer end. The mechanism shown in Figs. 1, 4, 5, 6 and 7 by means of which the index wheel is moved with mechanical precision through any required portion of a revolution and locked in any adjusted position consists in loosely mounting a ratchet wheel 66 on the mandrel 64 within a housing or casing 67 on the inner face of the index-wheel 65. This ratchet-wheel has an arm 68 radially projecting therefrom through a suitable opening in the casing 67 and when moved by a raising of said arm has its teeth engaged by a spring-pressed pawl 69 which is carried by the housing 66 of the index-wheel so that movement is communicated thereby to the latter. An adjustable rod 70 connects the arm 68 with an arm 71 projecting from the disk-like member 72, which is loosely mounted on the rock-shaft 73 without the frame 1. The arm 71 has its lowering movement limited by a radial lug 74 on the member 72 coacting with a stop-screw 75 carried by the adjoining frame part. The shaft 73 is transversely journaled in the frame 1 beneath the arbor-shaft 64 and has a disk 76 fixed to its inner end within the frame 1, as shown in Fig. 1, and an arm 77 fixed to its outer end in position to coact with a screw 78 carried by a lug 79 on the face of the member 72. When the shaft 73 is rocked, as hereinafter described, the arm 77, after first having a limited movement relative to the member 72, engages the screw 78 thereon to impart the requisite turning movement to said member for the purpose of elevating the rod 70 to effect a movement of the index-wheel 65.

A rod or link 80 connects the disk 76 with the lower end of a lever 81, which is fulcrumed to an arm projecting from the frame 1 beneath the shaft 46 and has its upper end forked and positioned to engage the lugs 82, which project in opposite directions from the sleeve 83. This sleeve is slidingly carried by the shaft 46 beneath the drum 18, and carries an idler-roll 84 for traveling in the cam-groove 21 of the drum, whereby a rotation of the drum imparts a reciprocatory movement to the sleeve. The sleeve is slotted, as at 83ª to permit its forward end to move past the pin 59 on its shaft. At a predetermined point in the forward movement of the sleeve the lugs 82 thereon engage the forked end of the lever 81, causing an oscillation thereof and a consequent partial rotation of the disk 76 and shaft 73. In order to prevent a turning of the sleeve 83 an arm 83ᵇ projects from one side thereof and has its outer end forked to have a sliding movement on a fixed bar 83ᶜ, which is mounted in parallelism with the shaft 46, as shown in Figs. 6 and 7. As the disk 76 is rotated an idler-roll 85 thereon moves upon a cam-surface 86 formed on the upper side of the arm 87, and causes a depression of the arm, which depression is maintained during the remainder of the stroke. The arm 87 is pivoted at its rear end to a boss 88, projecting inwardly from one side of the frame 1, and has its forward end forked and embracing the grooved collar 89, which is carried at the lower end of the vertical rod 90. This rod is mounted for vertical movement within a holder 91 secured to the end of the frame 1 and is normally retained elevated by the action of the spring 90ª so that its upper end engages one of the peripheral notches 65ª in the index-wheel 65 whereby to serve as a stop therefor. The journal-box in which the arbor-shaft or mandrel 64 is mounted is vertically adjusted by a hand-screw 92 to accommodate the machine to the truing of different sized gears. To permit of this adjustment the vertical rods 70 and 90 of the index-wheel controlling mechanism are both made longitudinally adjustable, as shown.

The sliding-sleeve 83 on the shaft 46, in addition to communicating motion from the drum 18 to the lever 81 of the work-controlling mechanism, also serves as a means for actuating the movement of the conical collar 45 carried on the shaft 46 therewith, as it engages the end of said collar just prior to its (the sleeve's) limit of forward movement, or approximately at the time the idler-roll 20 of the carriage 3 enters the neutral zone $a$ of the cam-groove 21 thus effecting a forward movement of the collar 45 against the tension of the spring 47 and a properly timed raising of the push-rod 44 to operate the rear trimmer-diamonds 40.

In Figs. 1, 2 and 3 is illustrated a suitable mechanism for manually controlling the trimming movements of the two sets of diamonds. This mechanism comprises a shaft 93, which is journaled in the frame part 23 in parallelism with the shaft 46, as shown in said figures, and carries an arm 94 for engaging the under side of a pin 95 projecting from the push-rod 44, and an arm 96 for having like engagement with a pin 97 projecting from the plunger or push-rod 51. The shaft 93 is mounted to have a limited longitudinal movement in its bearings and the arms 94 and 95 are relatively positioned thereon so that when the shaft is at the limit of inward movement the former only is in position to engage its pin, and when at its limit of outward movement the latter only is in position to engage its pin. An operating handle 98 is carried at the outer end of the shaft. It is thus apparent that when the shaft is pushed in and rocked in the proper direction an elevation of the push-rod 44 will be effected and when pulled out and similarly rocked an elevation of the plunger or push-rod 51 will be effected.

The operation of the machine is as follows: The work being positioned on the arbor-shaft or mandrel 64, which is properly adjusted to suit the size of the same, the means driving the gear-wheel 22 is thrown into operation to impart the proper rotation to the drum 18, which in turn communicates a properly timed longitudinal reciprocatory movement to the carriage 3 due to the idler-roll 20 carried thereby traveling in the circumferential cam-groove 21 of the drum. The forward movement of the carriage causes the rapidly revolving grinding-wheel 4, carried thereby, to traverse the upper face of the work between two of the teeth thereof, thus truing or removing all uneven surfaces or irregularities on the sides of the teeth with which it coacts, it being understood, of course, that the rim of the grinding-wheel is shaped to conform exactly to the desired shape of such space. When the grinding-wheel has traversed the face of the work the movement of the carriage is reversed and the wheel thereby returned through the same groove or space of the work to its original point of starting. As the carriage nears its limit of rearward movement the screw 11 carried by the arm 10ª has contact with an alining stationary portion of the frame 1ª, thus effecting an oscillation of said arm and causing the dog or pawl 9 carried thereby to engage and impart a fraction of a revolution to the ratchet-wheel 8 and screw 7 to which said wheel is fixed and effecting a very slight lowering of the grinding-wheel. The lowering mechanism is so regulated and adjusted that the movement imparted to the grinding-wheel is only sufficient to allow for the necessary trimming of the wheel in order to true it after a grinding operation. The grinding-wheel having been lowered, the idler-roll 20 enters the neutral zone $a$ of the cam-groove 21, thus causing a slight pause of the carriage 3 before again starting on its forward movement. During such pause the sliding-sleeve 33 on the shaft 46 strikes the extended end of the conical collar 45, moving it forward against the tension of the compression-spring 47 and effecting an elevation of the push-rod 44 due to the coaction of its lower end with the conical surface of the collar. This raising of the rod imparts simultaneous rocking movements to the two rear-trimmer diamond-holders 39, through the medium of the shafts 38 and arms 43, and causes the rear trimmer-diamonds 40 to move upward in unison in arcs concentric to the arcs $a$, $a$ of the grinding-wheel whereby to trim such surfaces preparatory to said wheel truing the suceeding groove or space in the gear-wheel being operated on to that trued in the previous operation. After the push-rod 44 has been elevated the idler-roll 20 enters the diagonally-disposed portion $b$ of the guiding-groove 21 which causes the carriage to move forward a sufficient distance for the axis of the grinding-wheel to stand in vertical alinement with the front trimmer-diamonds 49 of the trimming mechanism. At this point the idler-roll 20 enters the second neutral zone $c$ of the groove 21, causing the carriage to again pause in its movement, during which pause the finger 60, carried by the drum 18, coacts with the pin 59 carried by the shaft 46. As the finger strikes the pin the shaft 46 and collar 48 thereon are rocked sufficiently to throw the cam projection 48ª on said collar under the lower end of the plunger or push-rod 51, whereby to raise said plunger in position for the trimmer-diamonds 49 carried at its upper end to coact with the periphery or bead $b$ of the grinding-wheel.

At approximately the point of contact of the diamonds 49 with the grinding-wheel the idler-rolls 58 pass abruptly from the raised surfaces $e$ to the reduced surfaces $f$ of the arms 52 of the plunger, thus permitting the diamonds 49 to have a diverging movement transversely of the narrow face or bead $b$ of the rapidly revolving grinding-wheel, whereby to effect a smooth and even trimming of such surface. Upon a release of the two push-rods 44 and 51 they are, respectively, actuated by the springs 44ᵇ and 54 to return to their normal lowered positions. A manual raising of the rods 44 and 51 may be effected by moving the shaft 93 in or out, respectively, and pressing down on the handle 98 so that the arms 94 will coact with the pin 95 on the rod 44 or the arm 96 will coact with the pin 97, as the case may be, and effect a raising of the respective rods. Near the limit of rearward movement of the carriage 3 the disk 76 receives a partial revolution, due to the sliding-sleeve 83 on the shaft 46 striking and oscillating the lever 81. As the disk is turned the idler-roll 85 carried thereby moves upon the raised cam-surface 86 of the pivoted arm 87, effecting a depression thereof and a consequent disengagement of the member 90 from the registering notch in the index-wheel 65. The arm 71, which is keyed to the shaft with the disk 76 and turns therewith, is adjusted relative to the screw 75 carried by the member 72 so that it engages said screw immediately upon the release of the locking-member 90 from engagement with the index-wheel and effects a raising of the rod 70 and a consequent partial rotation of the ratchet-wheel 66. As the ratchet-wheel is moved it engages the pawl 69 and imparts the requisite movement to the index-wheel and arbor-shaft or mandrel 64 to rotate the gear-wheel 5 the distance of one tooth, so that each groove of the gear-wheel is successively acted on by the grinding-wheel. Upon a release of the rod 90 it is elevated by the action of the spring 90ª.

While we have shown our trimming mechanism as associated with a particular style of gear-truing machine, we wish it understood that we do not limit ourselves to its use in such connection, nor do we wish to restrict our invention to the particular construction or arrangement of the parts shown and described, as obvious modifications will occur to one skilled in the art.

Having thus described our invention, what we claim as new and desire to secure by Letters Patent, is,—

1. In a machine of the class described, the combination of a rotatable grinding-medium, means for imparting a reciprocatory movement to the grinding-medium, and mechanism for trimming the grinding-medium at predetermined points in its reciprocatory movement.

2. The combination with the grinding-medium of a gear-truing machine, of mechanism operative to trim the grinding-medium, and means coöperating with the mechanism for automatically imparting intermittent trimming movements thereto.

3. The combination with the grinding-medium of a gear truing machine, of opposing trimmer-diamonds, a mechanism operative to move said diamonds in the arcs of different circles whereby to trim the opposing marginal surfaces of the grinding-medium.

4. The combination with the grinding-medium and mechanism for imparting a reciprocatory movement thereto, of mechanism operated by said first mechanism to automatically trim the grinding-medium at a predetermined point in its reciprocatory movement.

5. The combination with the grinding-medium and mechanism for imparting a reciprocatory movement thereto, of opposing trimmer members movable in the arcs of circles to trim the operating surfaces of the grinding-medium, and mechanism for moving said members at a predetermined point in the reciprocatory movement of the grinding-medium.

6. The combination with a reciprocally movable grinding-wheel, of an oscillatory trimming member, and mechanism for effecting an oscillation of said member to trim the wheel at a predetermined point in the reciprocatory movement thereof.

7. The combination with a reciprocally movable grinding-wheel, of an oscillatory trimming member, mechanism for imparting a trimming movement to said member at a predetermined point in the movement of said wheel, and means for automatically operating said mechanism.

8. The combination with the grinding-wheel, and means for imparting a reciprocatory movement thereto, of an oscillatory trimming member and mechanism operated by said means for imparting an intermittent oscillatory movement to said member to move it across the surface of the wheel to be trimmed.

9. The combination with the grinding-wheel, and mechanism for imparting a reciprocatory movement thereto, of an oscillatory trimming member, and mechanism operated by said first mechanism for automatically moving said members to trim the wheel at a predetermined point in its reciprocatory movement.

10. The combination with the grinding-wheel, having its peripheral portion shaped to suit the work to be operated on, of trimmer means movable to trim the operating surface of the wheel, and mechanism for imparting movement to said means.

11. In a gear-truing machine, the combination of a rotary grinding-wheel, the reciprocatory mount therefor, the trimmer members movable relative to the wheel to trim the side operating surfaces of the same, and mechanism for imparting trimming movements to said members at a predetermined point in the reciprocatory movement of the wheel.

12. The combination with a grinding-wheel and mechanism for imparting a reciprocatory movement thereto and causing it to pause at a point in such movement, of members for trimming opposing surfaces of the wheel during the pause thereof, and mechanism for imparting the trimming movements to said members.

13. The combination with the grinding-wheel, of a plurality of trimmer members adjustable relative to the wheel and each other, and mechanism for imparting trimming movements to said members.

14. The combination with a grinding-wheel having opposed grinding-surfaces describing the arcs of different circles, of trimmer-members having trimming movements in arcs concentric to said surfaces, and mechanism for effecting such movements.

15. The combination with a grinding-medium, of opposed trimmer-members, and mechanism operative to move said members in unison to simultaneously operate to trim opposed marginal portions of the grinding-medium, substantially as described.

16. The combination with a grinding-medium, of opposed trimmer-members movable in the arcs of circles to simultaneously operate on different surfaces of the grinding-medium, and mechanism for intermittently moving said members for such purpose.

17. The combination with a rotary grinding-medium, of opposed trimmer-members movable to simultaneously operate on different surfaces of the grinding-medium, and mechanism for intermittently moving said members for such purpose.

18. The combination with a rotary grinding-medium, of an oscillatory trimming member, and mechanism for automatically effecting an intermittent oscillation of said member to move it across the surface of the medium to be trimmed.

19. The combination with a reciprocatory grinding-wheel having opposing arc-shaped grinding surfaces, of trimmer members adjustable relative to the wheel and movable in arcs concentric to said surfaces whereby to trim the same, and mechanism for effecting a positive movement of said members at a predetermined point in the reciprocatory movement of the wheel.

20. The combination with a grinding-wheel, and means for imparting a reciprocatory movement thereto, of a rock-shaft contiguous to the wheel, a trimmer member adjustably carried by said shaft, and mechanism for rocking said shaft to effect a movement of said member to trim a portion of the wheel operating surface at a predetermined point in the reciprocatory movement of the wheel.

21. In a gear-truing machine, the combination with the grinding-wheel, the longitudinally-movable carriage carrying the same, and means for imparting a broken movement to the carriage, of oscillatory trimmer-members, and mechanism for operating said members to trim the working surfaces of the wheel during a pause in the movement of the carriage.

22. In a gear-truing machine, the combination with the grinding-wheel, the reciprocatory carriage carrying the wheel, and the mechanism for moving the carriage, of a pair of trimmer-members, a push-rod having connection with and movable to rock said members, and means for effecting a movement of said rod at a predetermined point in the movement of the carriage whereby to trim the working surfaces of the wheel.

23. In a gear-truing machine, the combination with a grinding-wheel, of an oscillatory trimmer-member, a push-rod having connection with and movable to effect an oscillation of said member to trim the wheel, and means for imparting an intermittent movement to said rod during a running of the machine.

24. In a gear-truing machine, the combination with a grinding-wheel, of an oscillatory trimmer-member, a rock-shaft carrying said member, a rod having connection with and movable to rock said shaft, and means for imparting a properly timed movement to said rod whereby to move the trimmer-members to trim the wheel.

25. In a gear-truing machine, the combination with a grinding-wheel, of a plurality of oscillatory trimmer-members movable in the arcs of different circles, an element having connection with and movable to impart a unitary movement to said members whereby to trim the wheel, and mechanism for imparting an intermittent movement to said element.

26. In a gear-trimming machine, the combination with a reciprocatory grinding-medium, of sockets adjustably mounted adjacent the path of movement of said medium, bearing members carried by said sockets, shafts journaled in said members, trimmer means laterally projecting from the shafts in position to trim the medium when the shafts are rocked, means movable to impart a unitary rocking motion to the shafts, and mechanism for intermittently moving said means.

27. The combination with a grinding-wheel, of a bifurcated member, trimmer means carried by the furcations thereof, mechanism for moving the member into and out of operative position, and means coöperating with said members to move the trimmer means transversely of the wheel.

28. The combination with a grinding-wheel, of trimmer members movable to trim the face of the wheel, and mechanism for imparting opposed trimming movements to said members.

29. The combination with a grinding-wheel, of trimmer members having their trimming movements transversely of the wheel periphery, and mechanism for imparting opposed trimming movements to said members.

30. The combination with a grinding-wheel, of means movable transversely of the periphery thereof to trim the same, and mechanism for automatically imparting intermittent trimming movements to said means.

31. The combination with a grinding-wheel, of a member having parts carrying trimmer means for operating on the wheel, and mechanism for imparting opposed trimming movements to said parts.

32. The combination with a reciprocatory grinding-wheel, of a reciprocatory element, means carried by said element for trimming the wheel, and mechanism for moving said element in position for said means to engage the wheel at a predetermined point in the reciprocatory movement of the wheel.

33. The combination with a reciprocatory grinding-wheel, of means movable transversely of the periphery thereof to trim the same, and mechanism for moving said means at predetermined points in the reciprocation of the wheel.

34. The combination with a reciprocatory grinding-wheel, of a reciprocatory element, trimmer-means carried by said element in position to trim the wheel when the element is moved from normal position, and mechanism for imparting movement to said element whereby to trim the periphery of the wheel.

35. The combination with the grinding-wheel, and mechanism for imparting reciprocatory movement thereto, of a reciprocatory element, trimmer-means carried by said element, and mechanism for moving said element whereby the trimmer-means engages the wheel at a predetermined point in its reciprocatory movement.

36. The combination with the grinding-wheel, of a reciprocatory element having laterally movable parts, trimmer-means carried by each part, mechanism for moving said element in position for the trimmer-means to simultaneous engage the wheel, and means for imparting relative lateral movements to said parts.

37. The combination with the grinding-wheel, of an element movable relative to the wheel and having relatively movable parts, trimmer-members carried by said parts, mechanism for moving the element in position for the trimmer-members to engage the wheel, and means for imparting relative movements to said parts when the element is moved.

38. The combination with the grinding-wheel, of an element movable relative to the wheel and having an end thereof bifurcated, trimmer-members carried by the bifurcated end of said element, mechanism for moving the element in position for the trimmer-members to engage the wheel, and means for causing the trimmer-members to have relative lateral movements during their engagement with the wheel.

39. The combination with the grinding-wheel, of an element movable relative to the wheel and having a bifurcated end, trimmer-members carried by said end, means for moving the element in position for the trimmer-members to engage the wheel, means for normally retaining the element in retracted position, and means coacting with the bifurcated arms of the element for causing a converging movement thereof when moved from the wheel and permitting a spreading thereof when the trimmer members are in engagement with the wheel.

40. In combination, a grinding-wheel, a plunger movable relative thereto, trimmer-means carried at one end of said plunger, a cam member coacting with the other end of said plunger and movable to effect a coaction of the trimmer-means for effecting a properly timed movement of said cam member during a running of the machine.

41. The combination with a grinding-wheel, and the mechanism for imparting movement thereto other than its rotary movement, of a plurality of sets of trimmer-members, and mechanism for imparting differently timed trimming movements to said sets of members whereby to trim the wheel at different points in its movement.

42. The combination with a reciprocatory grinding-wheel, of a plurality of independent trimmer-means, and mechanism for causing said trimmer-means to successively act on the wheel to trim the working surfaces thereof at different points in the reciprocation.

43. The combination with a grinding-medium, of oscillatory trimmer-means, reciprocatory trimmer-means, and mechanism for imparting the respective trimming movements to said oscillatory and reciprocatory means.

44. The combination with a grinding-wheel, of oscillatory trimmer-members, reciprocatory trimmer-members, and mechanism for imparting differentially timed trimming movements to the respective members.

45. The combination with a grinding-wheel, of a set of oscillatory trimming-members, a second set of trimming-members movable toward and away from the wheel and having lateral trimming movements, means for effecting a relative lateral movement of the second set of members, and mechanism for imparting successive movements to the two sets of trimming-members.

46. The combination with a reciprocatory carriage, a grinding-wheel carried thereby and mechanism for imparting a broken movement to the carriage, of separate wheel trimming-means and mechanism for successively operating said trimming-means to act upon the wheel during different pauses in its reciprocatory movement.

47. The combination with a grinding-wheel having the work coacting surfaces $a$, $a$ and $b$, of mechanism operative to effect a simultaneous trimming of the surfaces $a$, $a$, and mechanism operative to effect a trimming of the surface $b$ and means for imparting trimming movements to said two mechanisms.

48. The combination with a grinding-wheel having the work coacting surfaces $a$, $a$ and $b$, of means movable to effect a simultaneous trimming of the surfaces $a$, $a$, means movable to effect a trimming of the surface $b$, and mechanism for imparting differentially timed trimming movements to said two trimming-means.

49. The combination with a grinding-wheel having curved and plain work coacting surfaces, of trimmer-means movable in arcs concentric to the curved surfaces of the wheel to trim the same, trimmer-means movable to trim the plain surface of the wheel, and mechanism for automatically imparting differentially-timed trimming movements to said two trimmer-means.

50. The combination with a grinding-wheel, of trimming-members movable in the arcs of different circles relative to the wheel, a reciprocatory element having relatively movable parts, trimmer-members carried by said parts and movable thereby laterally of the wheel whereby to trim its periphery, means movable to impart a trimming movement to the first mentioned trimming-members, and mechanism for imparting differentially-timed movements to said means and element.

51. The combination with a grinding-wheel and a trimming-mechanism of mechanism for automatically effecting a relative adjustment of the wheel and trimming mechanism after each grinding operation.

52. The combination with a grinding-wheel and a trimming-mechanism therefor, of means for automatically causing a relative predetermined converging movement of the wheel and trimming mechanism after each grinding operation.

53. The combination with a carriage, a grinding-wheel carried by the carriage, a mechanism for trimming the wheel, of means movable by a movement of the carriage to effect a relative adjustment of the wheel and trimming mechanism.

54. The combination with a movable carriage, a grinding-wheel adjustably carried thereby, and mechanism for trimming the wheel at a predetermined point in the movement of the carriage, of means operated by the movement of the carriage to effect a wear compensating adjustment of the wheel prior to each trimming operation.

55. The combination with a stationary frame, a movable carriage, a grinding-wheel adjustably carried thereby, and a wheel trimming mechanism, of means carried by the carriage for effecting a relative adjustment of the carriage and wheel, said means being operated by contact with the frame at a predetermined point in the movement of the carriage.

56. In combination, a movable carriage, a bracket adjustably carried thereby, a grinding-wheel journaled in the bracket, a trimming mechanism, and means for effecting an adjustment of the bracket at a predetermined point in the movement of the carriage whereby the wheel and trimming mechanism have relative adjustment.

57. In combination a stationary frame, a movable carriage, a bracket adjustably carried thereby, a grinding-wheel journaled in the bracket, a trimming mechanism, a screw carried by the carriage and coacting with the bracket to effect an adjustment thereof when the screw is turned, a ratchet-wheel fixed to the screw, a pivoted arm associated with the ratchet-wheel and adapted to have contact with and be moved by the frame at a predetermined point in the movement of the carriage, and a pawl carried by the arm in position to engage and turn the ratchet-wheel when said arm is oscillated.

58. In combination, a movable carriage, a grinding-wheel carried thereby, oscillatory wheel-trimming members, a push-rod having connection with and movable to effect an oscillation of said members, a shaft, a conical collar slidingly carried by the shaft and intended when moved from normal position to effect a reciprocation of the push-rod, a rotary drum having a circumferential cam-groove, means carried by the carriage and operating in the groove whereby movement is imparted to the former, and means having its movement controlled by the cam-groove and sliding on said shaft to effect a movement of the conical collar at a predetermined point in the movement of the carriage whereby to operate the trimming mechanism.

59. In combination a movable carriage, a grinding-wheel carried thereby, two sets of members movable to trim the wheel, a shaft, a sliding member on the shaft movable to effect a trimming movement of one of said members, a cam rotatable with the shaft to impart a trimming movement to the other of said trimming members, means slidable on the shaft to coact with and move said sliding member, and a rotatable element for imparting both a sliding movement to said means and a rocking movement to the shaft.

60. In combination, a grinding-wheel having its periphery fashioned to conform to a groove between the teeth of a gear-wheel, a plurality of trimmer means for acting on the sides and peripheral portion of part thus fashioned, and mechanism for imparting trimming movements to said means, substantially as described.

61. The combination with a grinding-wheel, of a movable carriage therefor, mechanism for trimming the wheel at a predetermined point in the movement of its carriage, and means coöperating both with the carriage and with the mechanism for operating the same.

62. The combination with a grinding-wheel, of a movable carriage therefor, mechanism for trimming the grinding-wheel and a rotary drum having a cam groove which, when the drum is rotated, coöperates both with the carriage and with the mechanism for imparting the operative movements thereto.

63. The combination with a grinding-wheel and a movable carriage therefor, of two sets of trimmer members, mechanism for operating both sets of trimmer members to trim the wheel at predetermined points in the movement of its carriage, and means coöperating both with the carriage and with the mechanism to impart the operative movements thereto.

64. The combination with a grinding-wheel having the peripheral operating surfaces $a$ $a$ and $b$, and the movable mount for the wheel, of two sets of trimmer members, one set adapted to operate on the surfaces $a$ $a$ and the other adapted to operate on the surface $b$, mechanism for causing said sets to operate on the wheel at different points in the movement of the carriage and means for effecting both a movement of the carriage and an operation of the sets of trimmer members.

65. The combination with a reciprocatory grinding-wheel, of a set of oscillatory trimmer members for operating on opposed surfaces of the wheel, a set of laterally movable trimmer members for operating on a periphery of the wheel and having opposed trimming movements, and mechanism for imparting trimming movements to the members of each set at predetermined points in the reciprocatory movement of the carriage.

66. The combination with a reciprocatory grinding-wheel, of a set of oscillatory trimmer members and a set of trimmer members movable both radially of the wheel and transversely thereof, the trimming movements of the reciprocatory members being opposed, and mechanism for imparting trimming movements to the members of each set.

67. The combination with a reciprocatory grinding-wheel, of a set of oscillatory trimming members, a push-rod coöperating with said members to effect a trimming movement thereof, a second push-rod having relatively movable parts, trimmer means carried by said parts and adapted, when the rod is reciprocated, to have movements transversely of the wheel periphery, mechanism for causing an intermittent reciprocation of the two push-rods whereby each operates on the wheel at a predetermined point in its reciprocatory movement and means operating on the relatively movable parts of the said second push-rod to effect a lateral movement of the trimmer means carried by such parts when the rod is moved.

In testimony whereof we have hereunto signed our names to this specification in the presence of two subscribing witnesses.

FREDERICK A. WARD.
WILLIAM N. TAYLOR.

Witnesses:
C. W. OWEN,
CORNELL SCHREIBER.